United States Patent [19]

Theil

[11] Patent Number: 4,975,697
[45] Date of Patent: Dec. 4, 1990

[54] MEASURING ARRANGEMENT

[76] Inventor: Thomas Theil, Alte-Traubinger-Strasse 5, 8133 Feldafing, Fed. Rep. of Germany

[21] Appl. No.: 410,554

[22] Filed: Sep. 21, 1989

[30] Foreign Application Priority Data

Sep. 21, 1988 [DE] Fed. Rep. of Germany ....... 3832097

[51] Int. Cl.[5] .......................... H03M 1/22; G01J 1/20; H01J 25/22
[52] U.S. Cl. ................................... 341/12; 250/203.1; 250/549; 315/5.25
[58] Field of Search ....................... 341/12, 11, 13, 15; 250/203.1–203.5, 549; 315/5.24, 5.25, 367

[56] References Cited

U.S. PATENT DOCUMENTS

| | | | |
|---|---|---|---|
| 3,265,902 | 8/1966 | Wingate | 341/12 |
| 3,588,696 | 6/1971 | Solvay | 250/549 |
| 3,878,532 | 4/1975 | Buck | 341/12 |
| 4,034,363 | 7/1977 | Van Etten et al. | 341/12 |
| 4,073,506 | 2/1978 | Favreau et al. | 250/549 |
| 4,227,187 | 10/1980 | McNamara et al. | 341/12 |

*Primary Examiner*—Vit W. Miska
*Attorney, Agent, or Firm*—Sughrue, Mion, Zinn, Macpeak & Seas

[57] ABSTRACT

In a measuring arrangement for the spacing between a marking (32) on a displaceable marking carrier (30) and a reference line, to produce a high degree of resolution and a low scanning frequency, at least two electrodes (17, 18) defining a measuring gap (20) are provided on the inside of the end (9) of a cathode ray tube (1). The deflection unit (6) of the cathode ray tube is actuated in such a way that the impact spot (7) of the electron beam (4), which covers the measuring gap in the transverse direction, moves along the measuring gap on the end (9) of the tube, without external influence, in such a way that the difference between the currents which flow away from the two electrodes is of a predeterminable value. The marking carrier exerts on the electron beam an influence which varies when the marking carrier is displaced and by means of which the impact spot is displaced transversely with respect to the longitudinal direction of the measuring gap. That influence can be kept constant by the impact spot being moved along with the marking carrier. The actuating signal for the deflection unit, which is required for that purpose, provides a measurement in respect of the spacing being sought.

15 Claims, 3 Drawing Sheets

MEASURING ARRANGEMENT

Various forms of measuring arrangements for determining the spacing between a marking on a displaceable body, such as a marking carrier or scale, and a reference line include the use of a cathode ray tube, as disclosed for example in German laid-open application (DE-OS) No. 36 08 884. The tube used therein is provided at the end of the tube with a phosphorus coating, by means of which the energy of the electron beam is converted into light which is emitted from a light spot which appears on the outward surface of the end of the tube. That light illuminates a marking carrier which is disposed in directly opposite relationship to the end of the tube and which forms the displaceable body or is rigidly connected thereto.

By actuating the deflecting unit of the cathode ray tube, the scanning spot which is produced by the above-mentioned illumination on the marking carrier can be moved over the marking carrier independently of a relative movement as between the marking carrier and the cathode ray tube, being modulated in dependence on its location by the marking or markings provided on the marking carrier. The modulated light preferably passes on to a photoelectric receiver in such a way that an output signal is produced with a differential characteristic which always passes through a predeterminable value, for example a zero level, when the scanning spot occupies a precisely defined and exactly reproducible position with respect to a marking. That position arises out of the deflection voltage or voltages which are applied to the deflecting unit of the cathode ray tube at the moment of such a passage through zero and which, in accordance with the state of the art, are preferably derived by means of a digital-analog converter from digital words which are predetermined by a computer or a control unit. The relative position of a marking which produces a given passage through zero, with respect to a selected reference line, is then described by the digital word or words which are produced at the moment of that passage through zero and which can be read out and displayed as corresponding measurement values or which can be passed to a further signal processing means.

Essential advantages of such an arrangement, besides the high level of measuring accuracy and degree of resolution, are the almost inertia-less deflection of the cathode ray tube, which permits a very high scanning frequency, as well as the possibility of deflecting the electron beam in two mutually perpendicular directions and thus displacing or reciprocating the scanning spot along paths of any desired configurations.

On the other hand the known arrangement suffers from a series of disadvantages and limitations. Thus, firstly the energy contained in the electron beam of the tube must be converted into light from which the photoelectric receiver then again produces an electrical signal. That costs energy and in particular makes it necessary to use a high voltage for accelerating the electron beam as the luminous intensity of the phosphorus depends on the kinetic energy of the electrons impacting thereon. In addition, the fact that the energy form representing the signal is converted twice means that the signal-noise ratio is worsened.

The graininess of the phosphorus coating also gives rise to additional noise which imposes on the configuration of the receiver output signal, which is actually 'smooth', positive and negative peaks which result in shifts of the passages through zero and thus give rise to a disadvantageous limitation in respect of the resolution capability.

A particularly serious aspect is the fact that, in order to produce a differential receiver output signal and thus a degree of resolution in the micrometer range, the marking carrier must be scanned by means of a constant movement of the scanning spot over a distance of several millimeters. That scanning movement must be maintained even when the marking carrier is displaced relative to the cathode ray tube. That means that very high scanning frequencies are required in that situation, so that it is necessary to use amplifiers with a large band width and very fast digital-analog converters, which give rise to correspondingly high levels of cost.

Furthermore the wide angle of emission of the light spot results in additional errors when reflective objects are to be found in the area around the measuring arrangement. In addition, because the measuring arrangement uses light in the visible range of the spectrum, the measuring arrangement is susceptible to distances due to ambient light.

Finally, the arrangement is of a disadvantageous installation size because the transmitter (cathode ray tube) and photoelectric receiver must be arranged separately from each other.

SUMMARY OF THE INVENTION

An object of this invention is to provide a measuring arrangement for ascertaining the spacing between a marking on a marking carrier and a reference line, which, with an at least acceptable degree of measuring accuracy, has an improved resolution capability without requiring extremely high scanning frequencies for that purpose.

Another object of this invention is to provide a measuring arrangement which is more compact than prior arrangement, is of a simpler design configuration with fewer components, and is move reliable in operation.

These and other objects are attained in accordance with the invention set forth herein.

The arrangement according to the invention eliminates the division into transmitter and receiver with modulation means disposed therebetween, and thus also the double conversion of the energy form serving as the signal carrier. Instead, in the arrangement of the invention, the path of the electron beam in the interior of the cathode ray tube and thus the position of the light spot on the end of the tube are influenced by different regions of the marking carrier in different ways so that displacement or a change in the position of the marking carrier or scale with respect to the end of the tube results in a displacement of the spot produced by impact of the electron beam on the end of the tube if no additional steps are taken. In order to be able to compensate for or detect for measurement purposes the displacement of the light spot induced by the marking carrier, arranged at the inside of the end of the tube are at least two electrodes which are electrically separated from each other and which enclose between them a narrow elongated measuring gap, the configuration of which is adapted to the form of the movement of the marking carrier which is to be detected. Thus the measuring gap is rectilinear for monitoring a linear movement, while it is of a circular or arcuate configuration for detecting angular movements.

The deflecting plates of the cathode ray tube are in principle actuated in such a way that, when the marking carrier is prevented from producing an effect, the impact spot of the electron beam is moved with its centre approximately at the middle of the measuring gap in the longitudinal directing thereof. To put that more precisely, the spot is controlled in such a way that the difference between the currents which are produced by the electron beam and which flow away by way of the two electrodes which delimit the measuring gap is equal to a predeterminable value and is preferably equal to zero.

That arrangement gives the advantage that the signals required for the measurement operation are always present in an electrical form so that the noise components which are produced in the state of the art when changing the energy form do not occur in the present arrangement. In particular there is no need for a phosphorus coating on the end of the tube so that the graininess which impairs the measurement result is eliminated. As the kinetic energy of the electrons which move in the electron beam no longer plays any part, it is possible to operate with substantially lower acceleration voltages. It is no longer possible for the measurement result to be adversely affected by extraneous light so that an optical screening can be omitted. Contamination due to dirt or dust, moisture or the like no longer causes problems.

The ways in which the marking carrier can act on the electron beam are such that it can displace the spot on the end of the tube only transversely with respect to the longitudinal direction of the measuring gap but not in the longitudinal direction thereof. That is preferably achieved by the marking carrier having at least one marking which is formed by a boundary surface or interface at which two magnetic regions, the longitudinal direction of which extends in the direction of the measuring gap, meet with their two magnetic North poles or their two magnetic South poles. From that interface at which the magnetic field disappears, a respective magnetic field extends in the direction of displacement of the marking carrier and thus in the longitudinal direction of the gap, the magnetic fields extending from the interface increasing with increasing spacing therefrom. That means that, when the electron beam spot is directly on the marking formed by the projection of that interface on to the end of the tube, the electron beam spot is not deflected in a transverse direction relative to the measuring gap, and that such deflection increases in direct proportion to the distance of the spot from such a marking.

If the electron beam spot is displaced transversely with respect to the longitudinal direction of the measuring gap, then the current which flows away by way of one of the two electrodes increases while the current which flows away by way of the other electrode decreases. That means that the difference between the two currents very rapidly rises towards a positive or a negative maximum value respectively, the sign of the differential current or a voltage derived therefrom depending on the direction in which the marking carrier is displaced. If it is known whether the interface producing the respective marking is a North pole/North pole interface or a South pole/South pole interface, it is then possible to arrive at a clear conclusion in respect of the direction of displacement, from the sign of the differential current which is produced when such displacement occurs. The arrangement according to the invention does not require the second marking track which is required in incremental displacement measuring value generators corresponding to the state of the art, for detecting the direction of displacement.

When the direction in which the marking carrier is displaced is clarified, then the electron beam spot is again brought into alignment with the marking in such a way that the difference between the currents that flow away by way of the two electrodes is equal to zero.

It should be expressly pointed out that that zero adjustment operation is not effected by displacement of the electron beam spot transversely with respect to the longitudinal direction of the measurement gap, under the effect of the deflecting plates, but rather is produced by virtue of the electron beam spot being adjusted to or tracking the marking in the longitudinal direction of the measuring gap until the influence of the marking carrier on the beam spot is again equal to its influence in the initial situation and is preferably therefore equal to zero. In order to be able to move the electron beam spot in the above-described manner with the moving marking, the computer which actuates the deflecting plates must constantly generate fresh deflecting voltages, preferably in the form of digital words, which at the same time provide a measurement in respect of the instantaneous position of the marking carrier.

With that measuring process the maximum speed at which the electron beam spot must be constantly displaced in the direction of the measuring gap is equal to or at most only materially higher than the maximum speed of displacement of the marking carrier or scale. The additional scanning movement which is required in the state of the art is eliminated as in this arrangement the differential characteristic of the output signal arises out of the difference between the currents which flow away by way of the two electrodes. Thus, even when very fast movements of the marking carrier are to be followed, it is possible with the arrangement according to the invention to operate with comparatively low scanning frequencies. That substantially reduces the circuitry expenditure in respect of the deflection amplifiers and the digital-analog converters for actuating the deflection amplifiers.

As the electrodes can be produced for example by vapour deposit of a layer of aluminium on the inward side of the end of the tube, with subsequent etching-out of the measuring gap and other regions which separate the conductive structures from each other, by means of the known photolithographic procedures, the electrodes can be shaped with a high degree of accuracy, in virtually any desired configuration. It is also possible to provide additional tracks for the calibration of the deflecting system, including the digital-analog converter or converters and the deflection amplifier or amplifiers.

As the overall system corresponds to a bridge circuit using the compensation process, as the output signal is always regulated to a fixed value, preferably zero, defects in the electronic receiving means have only a very slight effect.

The tracking width over which the electron beam spot can be moved with a marking which moves past the end of the tube in a linear movement is limited by the dimensions of the cathode ray tube. If therefore greater distances of displacement are to be followed for measurement purposes, the marking carrier must include a plurality of markings, the spacings of which are so small that, at the latest when the one marking leaves the region of displacement of the scanning spot, which is referred to hereinafter as the measuring window, the next marking has passed into the measuring window.

If the arrangement is used as an angle detecting means in which the axis of rotation about which the angular displacements occur coincides with the centre point of the circular measuring gap, then the arrangement is not subjected to a restriction of that kind. In that case it is in principle sufficient to have a single marking, the angular movements of which can be constantly followed by the electron beam spot. As however, as mentioned above, the marking is produced by two North or two South poles of two magnetic regions coming together, that necessarily gives a second marking at which the other two poles of the two magnetic regions adjoin.

Although the arrangement according to the invention must be shielded from external magnetic fields, it only has to be shielded from those magnetic fields which extend transversely with respect to the longitudinal axis of the cathode ray tube. That can be done in a simple manner by means of a Mumetal screen. In contrast magnetic fields in the longitudinal direction of the cathode ray tube do not have any influence on the level of measuring accuracy and the resolution capability of the arrangement.

If the magnetic regions on the marking carrier are not formed by means of permanent magnets but by means of one or more electromagnets which all have the same current flowing therethrough, then by switching off or reversing the polarity of that current, it is possible to detect, measure and thus also compensate for the presence of external interference fields.

By virtue of the fact that the cathode ray tube is simultaneously the transmitter and the receiver of the measuring arrangement, all parts of the measuring arrangement can be arranged on one side of the marking carrier. That results in a reduced structural size while also facilitating the provision of the shielding effect. The arrangement is insensitive to variations in the spacing between the end of the tube and the marking carrier, and also to lateral parallel displacement of the tube relative to the marking carrier. It is only necessary to avoid tilting or tipping movements which vary in the course of a measurement operation.

The arrangement may be used either as an incremental measurement value generator or as an absolute measuring apparatus. In the latter case the spacings between the markings are measured using the apparatus itself, in a calibration run which can also be repeated again and again between the measuring operations. In that case the spacings between the markings must be so small that in any position of the marking carrier, there are always at least two markings within the measuring window.

The marking carrier does not necessarily have to be arranged in front of the end of the tube. In accordance with the invention it is possible to use any positioning with respect to the cathode ray tube, which makes it possible to influence the electron beam between the deflecting unit and the end of the tube. If the electron beam is influenced directly downstream of the deflecting unit, then, with an action of the same strength, a correspondingly greater deflection effect will be produced at the end of the tube. That phenomenon can be used to increase the level of resolution capability.

Instead of being influenced by means of magnetic fields, the electron beam can also be influenced by means of electrostatic fields or alternating electrical fields. For that purpose the marking carrier may be provided, in succession in the direction of displacement thereof, with regions of alternately electrically positive and electrically negative polarity, relative to a ground plate which is arranged in the vicinity of the cathode ray tube. The foregoing considerations relating to magnetic fields also apply in the same manner and in substance in relation to the electrical fields which have the advantage that they permit the arrangement to be switched over and switched off more quickly.

Further objects, features and advantages of the present invention will be more clearly apparent from the following description of embodiments thereof.

Figure 1:
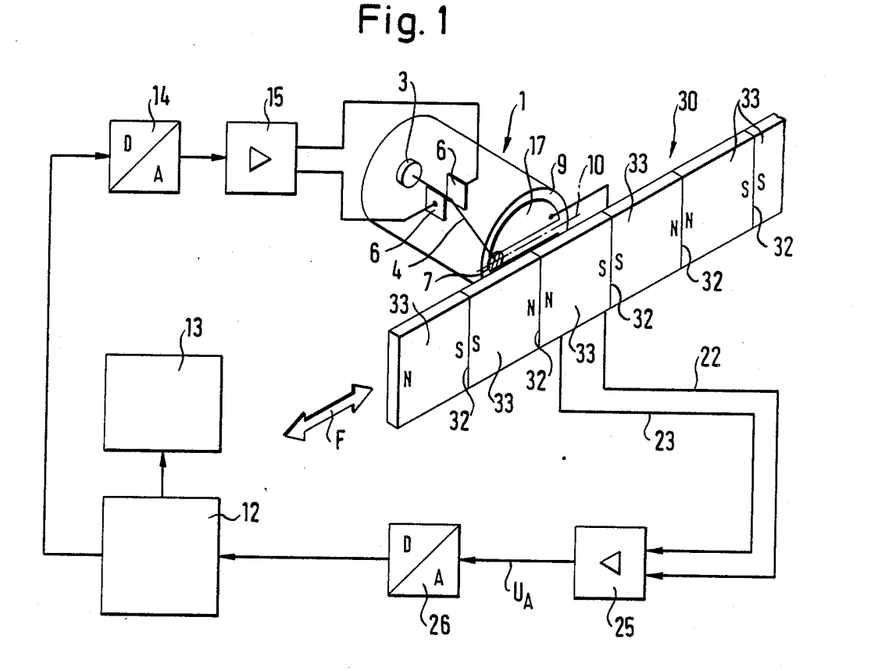
FIG. 1 is a partly perspective diagrammatic view of the measuring arrangement according to the invention.
Figure 2:
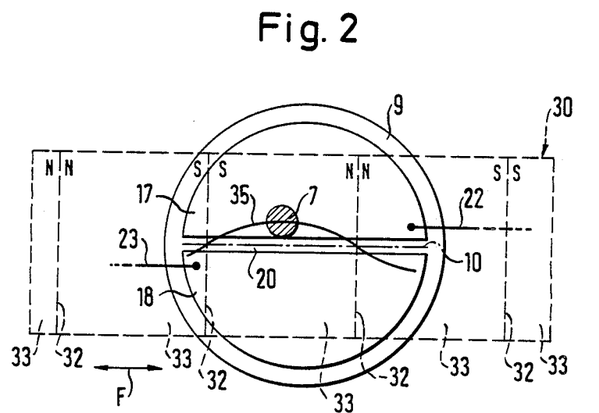
FIG. 2 is a view on to the end of the tube of the arrangement shown in FIG. 1, as viewed from the marking carrier.

As can be seen from FIGS. 1 and 2, a measuring arrangement according to the invention includes a cathode ray tube 1 having an electron gun 3 which is only diagrammatically illustrated, for producing an electron beam 4 which is focussed by means of a Wehnelt cylinder (not shown) and which can be deflected in two mutually perpendicular directions in known manner by means of electrostatic deflecting plates in such a way that the impact spot 7 of the electron beam 4 on the end 9 of the tube describes a path, the configuration of which can be predetermined by the voltages applied to the deflecting plates.

For the sake of simplicity FIG. 1 only shows the two deflecting plates 6 which are required for reciprocating the spot 7 in the direction of the dash-dotted line 10, which is referred to hereinafter as the X-direction. It will be appreciated however that the arrangement also has the deflecting plates (not shown) by means of which the spot 7 can be deflected or controlled in the direction which is perpendicular to the line 10 and which is referred to hereinafter as the Y-direction.

The voltages required to produce the deflection of the electron beam 4 are produced in the following manner:

To actuate the deflecting plates 6 a computer 12 produces a plurality of different digital words which are applied to a digital-analog converter 14 which converts each of those digital words into an analog voltage which is applied by way of a deflection amplifier 15 to the deflecting plates 6. Each of those digital words thus produces a defined deflection of the electron beam 4 or a defined displacement of its impact spot 7 in the X-direction.

In a corresponding manner the computer 12 applies a second set of digital words to a digital-analog converter (not shown) which also converts them into analog voltages which are applied by way of a deflection amplifier (not shown) to the deflecting plates serving to produce deflection of the spot 7 in the Y-direction.

In the embodiment illustrated in FIGS. 1 and 2, in which the measuring arrangement according to the invention serves to determine a spacing in respect of displacements in a straight line, the impact spot 7 is reciprocated only in the X-direction by the signals which are outputted by the computer 12. In the Y-direction the computer 12 controls the spot 7 in such a way that, when no further deflection forces are acting on the electron beam 4 from the exterior, the spot 7 is moved approximately along the dash-dotted line 10. The precise criterion in respect of actuation in the Y-direction, in the situation where there are no additional deflecting forces from the exterior, will be described in greater detail hereinafter.

As can be seen in particular from FIG. 2, provided at the end 9 of the bottom of the cathode ray tube 1 on the inside thereof are two electrically conductive electrodes 17 and 18 which are geometrically and electrically separated from each other by a narrow measuring gap 20. The measuring gap 20 is arranged in such a way that it extends in the X-direction and the dash-dotted line 10 forms the longitudinal centre line of the measuring gap 20.

The dimension of the spot 7 in the Y-direction, that is to say normal to the measuring gap 20, is greater than the width of the measuring gap so that, when the middle of the spot 7 is not too far away from the line 10 in the Y-direction, one part of the electrons which are accelerated in the electron beam 4 from the electron gun 3 to the end 9 of the tube impinges on the electrode 17 and the other part of the electrons impinges on the electrode 18, or flows away from the measuring gap 20 to one of those electrodes. The two electrodes 17 and 18 are connected by way of diagrammatically illustrated connections 22 and 23 to a differential amplifier 25 which outputs a signal voltage $U_A$, the absolute amount of which is a measurement in respect of the difference $I_{17}-I_{18}$ between the currents which flow away by way of the respective electrodes 17 and 18, while the sign of the signal voltage indicates whether the spot 7 is deflected away from the line 10 more towards the electrode 17, that is to say more upwardly in FIGS. 1 and 2, or more towards the electrode 18, that is to say more downwardly in FIGS. 1 and 2. The output voltage $U_A$ of the differential amplifier 25 is digitised by means of an analog-digital converter 26 and fed to the computer 12.

The above-mentioned precise criterion in respect of actuation in the Y-direction provides that the computer 12 always produces the digital words for the deflecting plates (not shown) for producing deflection of the electron beam in the Y-direction, in such a way that, when there are no external deflecting forces acting on the electron beam 4, the spot 7, upon deflection in the Y-direction, is guided along the measuring gap 20 in such a way that the difference between the currents $I_{17}-I_{18}$ is always equal to zero. It will be appreciated that the digital words required to maintain that condition can only be ascertained or, when deviations occur, corrected, when there is no marking carrier 30 in the vicinity of the end 9 of the tube, in the manner illustrated in FIG. 1. The influence exerted on the electron beam 4 by such a marking carrier 30 is not compensated by the computer 12 by means of a change in the deflection of the electron beam in the Y-direction so that the arrangement in FIG. 1 does not form a regulating loop in that sense.

Therefore, in situations in which, as shown in FIGS. 1 and 2, the measuring arrangement according to the invention is to provide for following the rectilinear displacement of at least one marking disposed on a body, with respect to a reference marking, for measurement purposes, so that the measuring gap 20 between the two electrodes 17 and 18 is of a rectilinear configuration, the deflecting plates (not shown in FIG. 1) for producing deflection of the electron beam 4 in the Y-direction, can be replaced by a correction coil through which is passed a current which is adjusted in known manner in such a way that the beam rotation produced by the magnetic field generated by that coil provides that the spot 7 of the electron beam 4 which is deflected only by way of the X-direction deflecting plates 6 moves precisely along the measuring gap 20 in the above-described manner when there are otherwise no additional deflecting forces acting on the arrangement from the exterior.

As can further be seen from FIGS. 1 and 2, arranged directly in front of the end 9 of the tube is a marking carrier 30 which is displaceable with a reciprocating movement in the direction indicated by the double-headed arrow F. In the illustrated embodiment the marking carrier 30 has a plurality of markings 32 which are formed by the provision on the marking carrier 30 of a plurality of rectilinear magnetic regions, each of which is so arranged that the straight line connecting its magnetic North pole to its magnetic South pole extends in the direction of displacement, that is to say in the direction of the double-headed arrow F. The above-mentioned magnetic regions are so arranged in relation to each other that the magnetic South pole of a region directly adjoins the magnetic South pole of the one adjacent region and the magnetic North pole directly adjoins the magnetic North pole of the other adjacent region. The perpendicular projections of the boundary surfaces or interfaces at which magnetic South poles and magnetic North poles of the respective magnetic regions 33 adjoin, on to the end 9 of the tube, represent the markings 32, the displacement of which in the direction indicated by the double-headed arrow F and the spacing of which, as measured in that direction, from a reference line which can be predetermined by means of the cathode ray tube 1, can be measured. In addition, it is also possible by means of the arrangement according to the invention to measure the spacings between each two mutually adjacent markings 32 with a very high degree of accuracy, as will also be described hereinafter.

In the arrangement illustrated in FIGS. 1 and 2, the magnetic fields of those magnetic regions 33 which are disposed in front of the end 9 of the tube, wherever those magnetic fields are not equal to zero, displace the spot 7 of the electron beam 4 away from the location on the end 9 of the tube, on to which the electron beam 4 would impinge, if the marking carrier 30 were not present.

On the assumption that the magnetic fields in the magnetic region 33 are homogeneous, that deflection of the spot 7 occurs exclusively in the Y-direction, without involving a shift in its position in the X-direction.

If therefore the marking carrier 30 is arranged in the manner shown in FIGS. 1 and 2 in the direct vicinity of the end 9 of the tube and if the deflecting plates 6 are actuated in such a way that the spot 7 moves in the X-direction, then, as shown in FIG. 2, it no longer moves along a path following the dash-dotted line 10, but rather it follows a substantially sinusoidal curve 35 which intersects the dash-dotted line 10 precisely where there are markings 32. At those locations the magnetic fields produced by the marking carrier 30 or the magnetic regions 33 disposed thereon are equal to zero so that at those locations the spot 7 does not involve any deflection from its path which is predetermined by actuation of the deflecting plates.

If it is assumed that the spot 7 is initially disposed precisely at the location of a marking 32, then, by virtue of the above-indicated condition in regard to actuation of the Y-direction deflecting plates or the corresponding correction coil, the difference between the currents which flow away by way of the two electrodes 17 and 18 when the spot 7 is in that position is equal to zero. If now the spot 7 is firstly held fast in the X-direction by virtue of suitable actuation of the deflecting plates 6 and if the marking carrier is displaced towards the left or towards the right in the direction indicated by the double-headed arrow F, then regions which are different from the value zero, of the magnetic fields which are generated by the marking carrier 30, act on the electron beam 4 and the spot 7 is displaced in the Y-direction either towards the electrode 17 or towards the electrode 18. The electrode towards which the spot 7 is displaced depends on whether the marking 32 which at that moment is moving away therefrom is a marking formed by South poles or a marking formed by North poles, and whether the marking is moving towards the left or towards the right. At any event the difference between the currents flowing away by way of the two electrodes 17 and 18 changes and assumes a value which is different from zero; in that case, when it is known whether the marking which is being followed at that time is a North pole/North pole marking or a South pole/South pole marking, it is possible to deduce the direction of displacement of the marking carrier or scale 30, from the sign of the differential current which is produced.

A similar consideration also applies in regard to the sign of the output voltage $U_A$ of the differential amplifier 25, which is supplied to the computer 12 by the analog-digital converter 26, as well as the absolute amount of that voltage. In the 'measurement' mode of operation, the computer 12 evaluates and analyses that information in such a way that it outputs a fresh digital word which, by way of the digital-analog converter 14, the deflection amplifier 15 and the deflecting plates 6, causes the spot 7 to track the marking 32 which is moving away therefrom, until the difference between the currents which flow away by way of the two electrodes 17 and 18 and therewith also the output voltage $U_A$ of the differential amplifier 25 is again equal to zero. The passage through zero of the output voltage $U_A$ of the differential amplifier 25 may be of such a steep configuration with the arrangement according to the invention that the tracking action of the spot 7 takes place with a high degree of precision, so that the measurement operations can be carried out with a very good resolution capability and, if the arrangement also includes calibration devices which are described in greater detail hereinafter, also with a very high degree of accuracy.

For each new position which is occupied by a marking 32 which is followed in that way, on the basis of the tracking operation just described above, the computer 12 must output a new digital word which represents a precise measurement in respect of the instantaneous spacing of the marking 32 being considered, from any selectible point which defines the reference line, on the dash-dotted line 10. As can be seen in particular from FIG. 2, the spacings between the markings 32 are so selected that in any position of the marking carrier 30, there are at least two markings 32 disposed in front of the end 9 of the tube. If therefore a correspondingly large displacement of the marking carrier 30 means that the marking 32 with which the computer 12 is just in the course of moving the spot 7 along passes out of the region of movement of the spot, then it is always certain that there is a further marking 32 in that region of movement, and the computer 12 will find that further marking 32 by virtue of displacing the spot 7 in the X-direction, in the opposite direction to the previous direction of movement, until the output voltage $U_A$ of the differential amplifier 25 has again become equal to zero. When that condition is reached, the new digital value generated by the computer 12 again provides the precise position of the 'new' marking 32, with respect to the selected reference line. If the spacing of that new marking 32 from the marking 32 which was being previously followed is known, then as a result the spacing of the previously followed marking from the reference line can still be specified.

It had already been pointed out above that the measurement process described herein only operates satisfactorily when the magnetic fields for deflecting the spot 7, in the X-direction, are homogeneous because otherwise the magnetic field itself would also produce a deflection in the X-direction of the spot 7; the result of that would be that the X-direction digital word generated by the computer 12 would no longer be representative in respect of the instantaneous actual position in the X-direction of the spot 7. Nonetheless there is no necessity that, for each magnetic region 33, the magnetic field generated thereby, in the X-direction, is highly homogeneous over its entire length. As in accordance with the invention the measurement values are detected whenever the spot 7 is disposed in the direct vicinity of a marking 32 which is formed by the respective interface between two North poles or two South poles, in that situation the magnetic fields acting on the electron beam 4 are equal to zero on the X-direction and also in the Y-direction and are thus automatically 'homogeneous'.

The arrangement according to the invention can be used either as an incremental measuring apparatus or as a measuring apparatus which operates in absolute terms. In the former case it is necessary for the markings 32 to be disposed on the marking carrier 30 with a high degree of regularity and accuracy, corresponding to the desired level of measuring accuracy. In that respect the spacings between the markings 32 must satisfy the above-indicated condition, that is to say they must be somewhat less than the length of the measuring window, which means the maximum deflection of the spot 7 in the X-direction by means of the deflecting plates 6. In that case, when the arrangement is switched on, the computer 12 firstly causes the measuring spot 7 to pass once over the length of the whole measuring window.

From the resulting signs of the output voltage $U_A$ of the differential amplifier 25 and the number of times that that voltage passes through zero, the computer can recognise whether there are one or two markings 32 in front of the measuring window. If there is only one marking in front of the measuring window, the computer 12 can detect whether that marking is a North pole/North pole marking or a South pole/South pole marking. If there are two markings in front of the measuring window, the computer recognises which of the two markings is the North pole/North pole marking and which is the South pole/South pole marking. In both cases the computer 12 then controls the spot 7 in such a way that the output voltage $U_A$ of the differential amplifier 25 becomes equal to zero and the spot 7 is therefore disposed at the one marking 32 which is positioned in front of the measuring window, or at one of the two markings disposed in front of the measuring window. The digital word which the computer 12 must generate in order to produce that position of the spot 7 then reproduces the spacing of the respective marking from a selected reference line. If now the marking carrier 30 is set in movement in one of the two directions indicated by the double-headed arrow F, the computer 12 initially briefly retains the spot 7 at the previous location thereof in order to be able to ascertain the direction of movement of the marking carrier 30, on the basis of the sign of the output voltage $U_A$, which differs from zero, of the differential amplifier 25. After the direction of movement has been ascertained, the computer 12 again brings the spot 7 into alignment with the marking ($U_A=0$) and moves it along with that marking as long as that marking is moving within the measuring window. If the marking carrier 30 comes to a halt before that marking leaves the measuring window, then the difference between the original digital word and the digital word which is now produced reproduces the length of displacement of the marking carrier.

If the marking carrier 30 moves over a greater distance, then, by virtue of the above-indicated condition, a new marking 32 must appear in front of the measuring window before the marking 32 to which the spot 7 was previously 'attached' leaves the measuring window. Shortly before the 'old' marking leaves the measuring window, the computer 12 then causes the spot 7 to go back to the 'new' marking and follows the movement thereof in the same manner as was just described above in respect of the 'old' marking. That procedure can be repeated until the marking carrier 30 has come to a halt in its new position. The digital word which the computer 12 must generate in that new rest position in order to keep the spot 7 at the respective marking 32, together with the number of markings which have moved past the measuring window and the digital word generated at the beginning of the displacement, then reproduces the length of displacement of the marking carrier 30.

If it is clear from the outset that the marking carrier 30 is to cover a distance which is so great that a plurality of markings will move past the measuring window, which can be indicated by a suitable signal, then the computer 12 may also initially retain the spot 7 in the position in which it was aligned with a marking at the beginning of the movement. By virtue of the movement of the magnetic regions 33 past the measuring window, the spot 7 then swings up and down in the Y-direction, with the output voltage $U_A$ of the differential amplifier 25 always passing through zero when a marking 32 moves past the spot 7. The number of passages through zero which occur is then equal to the number of markings which have passed. If they are multiplied by the unitary spacing between each two markings, that gives a coarse measurement value in respect of the length of the movement involved. When then the marking carrier 30 has come to a halt again, the computer 12 can move the spot 7 to the marking 32 which had passed last, and bring the spot 7 into alignment therewith. That then again gives the same digital word as in the case of the above-described procedure, that word, in conjunction with the coarse measurement value, representing the total distance travelled.

If in comparison therewith the arrangement according to the invention is to be used as an absolute measuring apparatus, it is desirable for all spacings between mutually adjacent markings 32 to be different from each other. In addition they are so selected that at least two markings are disposed in front of the measuring window, in any position of the marking carrier.

In order to be able to measure with a high degree of accuracy with such an arrangement, the apparatus according to the invention is firstly used to carry out a calibration run which can also be repeated between the individual measuring operations, in order to measure off all the spacings between adjacent markings and to store them, while retaining the association between each spacing and the respective pair of markings. If then during the actual measuring operation any pair of markings is disposed in front of the measuring window, the computer 12 is capable of ascertaining from the spacing between the two markings, which pair of markings is involved so that the computer can also precisely determine the instantaneous position of the marking carrier 30.

As an alternative thereto it is also possible for the markings 32 disposed on the marking carrier 30 to be identified in some other manner, for example by counting off the markings, starting from a particularly indicated zero marking, and then, by means of the identification signal which is obtained in that way, to call up from the above-mentioned memory, the spacings of that marking relative to the two adjacent markings respectively associated therewith.

Figure 3:
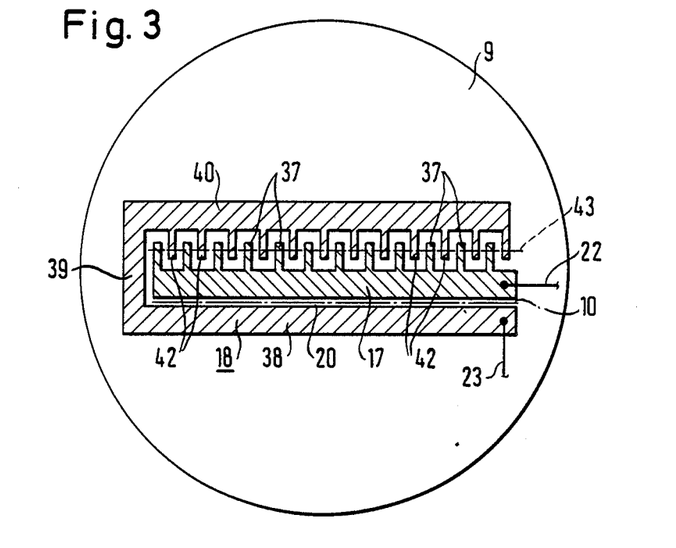
FIG. 3 is a view on to the end of the tube, corresponding to the view shown in FIG. 2, on an enlarged scale, with a modified electrode configuration.

FIG. 3 is a view corresponding to that shown in FIG. 2, on an enlarged scale, illustrating the end 9 of the tube of a modified embodiment of the measuring apparatus according to the invention, in which the electrodes 17 and 18 mounted on the end 9 of the tube on the inside thereof are of such a configuration that drift and fluctuation phenomena which could disturb the strict correlation between the digital words outputted by the computer 12 and the corresponding positions of the spot 7 on the end 9 of the tube can be detected by means of calibration cycles and thus eliminated in terms of their effect on the level of accuracy of the measurement result.

As can be seen from FIG. 3, the two electrodes 17 and 18 also enclose a rectilinear measuring gap 12 in which the dash-dotted line 10 illustrated describes the path along which the electron beam spot (not shown) passes when the beam is deflected by the X-direction deflecting plates, when no deflection forces are acting on the arrangement from the exterior. As in FIGS. 1 and 2, the two electrodes 17 and 18 are connected by way of connecting wires 22 and 23 which are represented in symbolic terms in FIG. 3, to the two inputs of a differential amplifier which produces an output signal $U_A$ corresponding to the difference between the two currents which flow away by way of the electrodes 17 and 18.

As can be seen from FIG. 3, the measuring gap 20 does not have to pass through the centre point of the circular end 9 of the tube. This construction only involves selecting the deflection voltage for the Y-direction deflecting plates somewhat differently from the situation in the embodiment shown in FIGS. 1 and 2.

It will also be seen from FIG. 3 that, on its longitudinal side which is in opposite relationship to the measuring gap 20, the electrode 17 has projections 37 which extend in the Y-direction and which are uniformly spaced from each other in the longitudinal direction of the measuring gap 20.

The electrode 18 is generally of a substantially U-shaped configuration and is so arranged that, with the inward side of its one limb 38, it forms the lower boundary of the measuring gap 20.

The web portion 39 which connects together the two limb portions of the electrode 18 extends upwardly in the Y-direction to the left of the electrode 17 in FIG. 3. The upper limb 40 of the electrode 18 extends parallel to the measuring gap 20 at such a spacing from the electrode 17 that it does not touch the projections 37 of the electrode 17, which face towards it. At its inward side which is in opposite relationship to the electrode 17, the limb 40 has a row of projections 42, the number of which is equal to the number of projections 37 on the electrode 17. The projections 42 are so arranged that they extend away from the limb 40 towards the electrode 17 and into the spaces between the projections 37. In that region therefore the two electrodes 17 and 18 form two intermeshing comb-like structures which however are completely electrically separated from each other.

For the purposes of carrying out a calibration measurement operation, care is firstly taken to ensure that no magnetic fields coming from the marking carrier of the measuring arrangement can affect the electron beam. When the magnetic fields of the marking carrier are generated by permanent magnets, the marking carrier is pulled sufficiently far away from the end 9 of the tube, to achieve that purpose. If on the other hand the magnetic fields are generated by electromagnets, as will be described in greater detail hereinafter, it is sufficient for the excitation current to be switched off.

At any event, the impact spot of the electron beam can be moved to and fro on a path indicated by the broken line 43, parallel to the measuring gap 20, by suitable actuation of both the X-direction and the Y-direction deflecting plates. When that happens, the electron beam impact spot has a plurality of positions which are geometrically precisely defined on the end 9 of the tube and in each of which the spot is disposed in the middle between an upwardly pointing projection 37 of the electrode 17 and a downwardly pointing projection 42 of the electrode 18 so that the difference between the currents which flow away by way of the two electrodes is equal to zero.

For each of those geometrically precisely defined positions which can be very exactly positioned and measured in production of the tube, there is then a X-digital word describing that respective position. Accordingly, a clear association is made between those digital words and the positions of the spot in the X-direction on the end 9 of the tube. Therefore any non-linearities in respect of the digital-analog converter 14, drift phenomena in respect of the deflection amplifier 15 and temperature-governed fluctuations in the electron-optical deflection geometry in the interior of the tube can be repeatedly detected. The end 9 of the tube can be produced without involving particular expenditure from a glass material which has an extremely low coefficient of thermal expansion. The comb-like structures 37 and 42 of the electrodes 17 and 18 can also be applied with current photolithographic processes, with a very high degree of accuracy and a very high resolution capability, without involving a particularly high level of costs.

Figure 4:
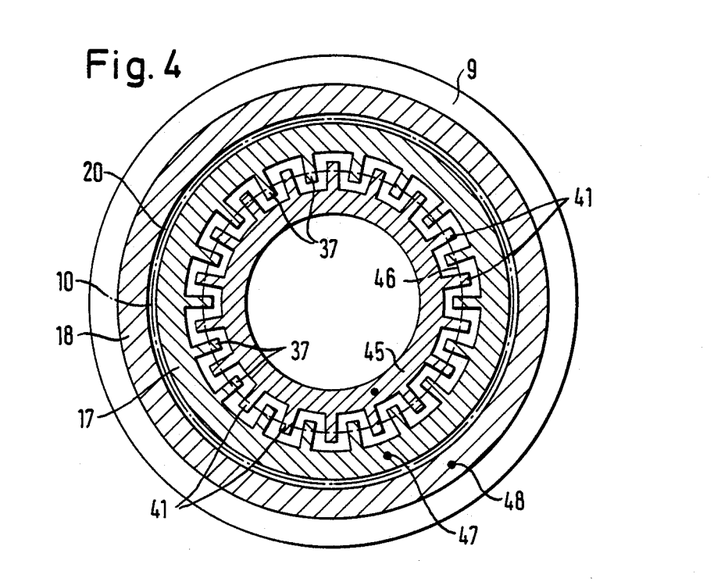
FIG. 4 is a view on to the end of the tube, corresponding to the view shown in FIG. 3, for a measuring arrangement according to the invention which is in the form of an angle detecting means.

FIG. 4 is a view of the end 9 of the tube, corresponding to that shown in FIG. 3, in a further embodiment of the measuring arrangement according to the invention which serves for measuring angular spacings or angular displacements and which also has a comb structure in respect of the electrodes, for calibration and recalibration purposes. In principle the arrangement of the electrodes is the same as in the previously described embodiment, except that the electrodes 17 and 18 are in the form of circular rings in order to provide an annular measuring gap 20. The dash-dotted line 10 in the middle of the measuring gap 20, which line 10 which is of a circular configuration in this embodiment, again describes the path of movement of the electron beam impact spot when no deflection forces are acting on the arrangement from the exterior. It is clear that, with a cathode ray tube with an end 9 of that kind (just as in the case of the embodiment shown in FIG. 3), there must be two pairs of deflecting plates in order to be able to guide the electron beam spot along the circular path.

In FIG. 4, on its side remote from the measuring gap 20, the electrode 17 has a plurality of projections 37 which extend radially towards the middle of the end 9 of the tube and the angular spacings of which are predetermined with a high degree of accuracy and uniformity in manufacture of the cathode ray tube. In this embodiment, arranged radially within the electrode 17 is an auxiliary or calibration electrode 40 which is of an annular configuration and which has radially outwardly pointing projections 42 which project into the spaces between the projections 37 of the electrode 17. That auxiliary or calibration electrode 40 is electrically conductively connected to the outer electrode 18 by way of a line (not shown). This construction therefore also comprises two intermeshing comb structures, the mode of operation of which is the same as the corresponding comb structures in FIG. 3. The only difference is that the comb structures in FIG. 4 permit calibration of the angular position of the electron beam spot when, with the marking carrier rendered inoperative, the spot is passed on a circular path along the dashed line 47.

A marking carrier which is suitable in conjunction with the electrode configuration shown in FIG. 4 for angular measurements or angular displacements only has to have two magnetic regions, each of which is of a semicircular configuration and which are arranged in such a way that on one side they adjoin each other with their South poles while on the other side they adjoin each other with their North poles. That marking carrier is then arranged concentrically with respect to the centre point of the electrode configuration shown in FIG. 4, in such a way that the projections of the North pole/North pole and the South pole/South pole interfaces on the end 9 of the tube extend radially and in so doing intersect the measuring gap 20. That configuration therefore provides two mutually diametrically oppositely disposed markings, the rotational movement of which, relative to the common centre, can be measuringly ascertained and followed in the same manner as was described hereinbefore in relation to linear displacements of markings.

As an alternative thereto, in accordance with the invention, a marking carrier which can be used with the electrode configuration shown in FIG. 4 may include more than two magnetic regions which however are always arranged in such a way that they form a closed circular ring, the projection of which always covers over the measuring gap 20. That then provides a correspondingly large number of radially extending markings, the angular displacements of which can be followed and measuringly detected by means of the scanning spot.

It will be clear that the FIG. 4 embodiment also provides that the electrodes 17 and 18 are connected to a differential amplifier 25 by way of suitable conductors. FIG. 4 only shows the connecting points 47 and 48 of those conductors.

Figure 5:
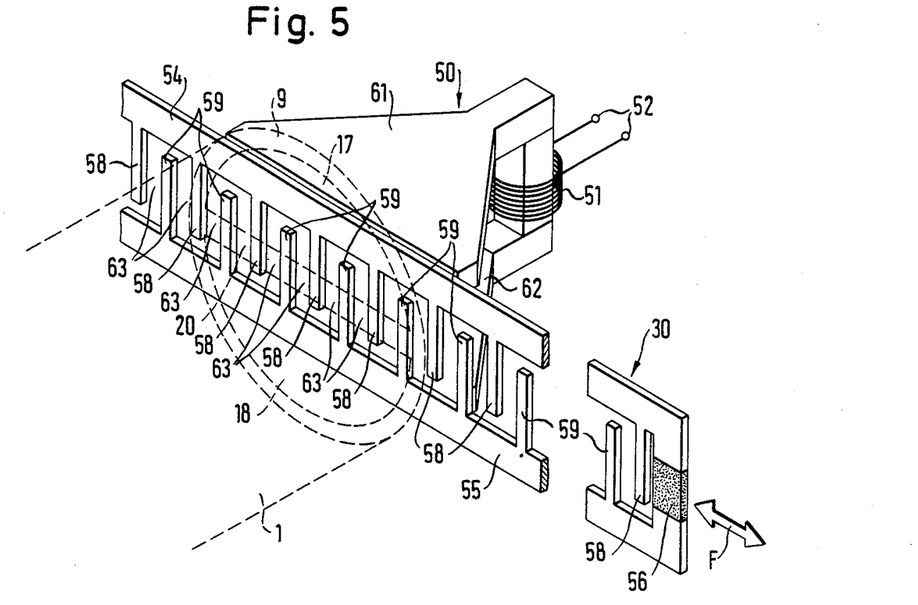
FIG. 5 is a perspective view of the marking carrier and an electromagnet of a further embodiment, the cathode ray tube being indicated only in broken lines.

FIG. 5 shows an embodiment of the apparatus according to the invention in which the magnetic portions of the measuring scale 33 are not produced by means of permanent magnets but by means of an electromagnet 50, the excitation coil 51 of which can be supplied with a suitable current by way of connections 52.

In FIG. 5 which shows the measuring scale 30 and the electromagnet 50 in a perspective view as seen from the cathode ray tube 1, the cathode ray tube 1 with the end 9 thereof, the electrodes 17 and 18 provided at that location and the linear measuring gap 20 defined by the electrodes are only indicated by means of broken lines.

As can be seen from FIG. 5, the scale 30 which is displaceable in the direction indicated by the double-headed arrow F comprises two limbs 54 and 55 which extend in that direction of displacement and which are disposed in mutually parallel relationship and which are arranged at a spacing from each other transversely with respect to the direction of displacement and which comprise a material with a high level of magnetic permeability, for example Mumetal and which, at least at both ends of which only one is shown in FIG. 5, are mechanically connected together by a spacer portion 56, while however being magnetically separated from each other.

The upper limb 54 of the measuring scale 30 has a plurality of regularly spaced projections 58 which extend towards the lower limb 55 while the lower limb 55 has an equally large number of regularly spaced projections 59 which extend towards the upper limb 54 and which are arranged in displaced relationship with the projections 58 in such a way that they halve the respective spacings thereof.

The electromagnet 50 has two pole shoes 61 and 62 which extend in a horizontal direction and which are so arranged that their front ends which, in the direction of displacement of the marking carrier or scale 30, are of an extent which corresponds to the diameter of the end 9 of the tube, are arranged, as viewed from the cathode ray tube 1, directly behind the upper limb 54 and the lower limb 55 respectively of the marking carrier 30. By virtue of that configuration, the upper limb 54 and the downwardly facing projections 58 which extend therefrom form for example magnetic South poles while the Lower limb 55 and its upwardly directed projections 59 represent magnetic North poles. Accordingly, between mutually adjacent projections 58 and 59 there are horizontally aligned magnetic regions 63 which correspond in terms of their arrangement and function to the magnetic regions 33 in FIGS. 1 and 2. Therefore each of the projections 58 and 59 forms a marking corresponding to the markings 32 in FIGS. 1 and 2.

Figure 6:
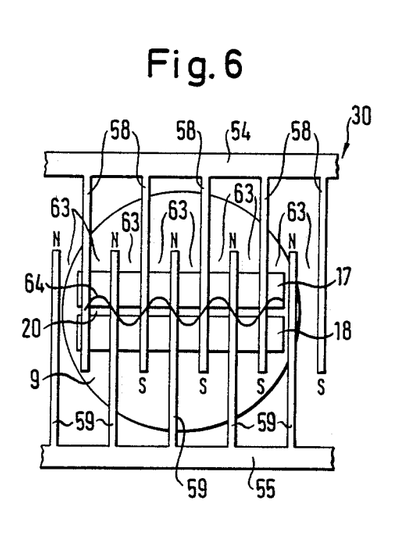
FIG. 6 is a view corresponding to that shown in FIG. 2 of the end of a tube with a marking carrier as shown in FIG. 5.
Figure 7:
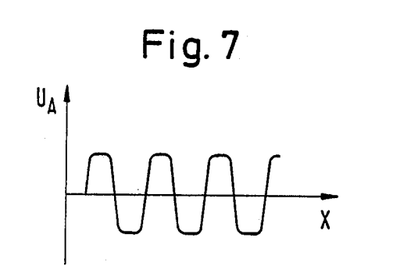
FIG. 7 shows the output signal which is produced in an arrangement as shown in FIG. 6 at the output of the differential amplifier which subtracts from each other the currents which are produced by the electron beam and which are taken off by way of the two electrodes.

That is again illustrated in FIG. 6 which illustrates the marking carrier 30 from FIG. 5, with the end 9 of the cathode ray tube disposed therebehind, as seen from the electromagnet 50 which is omitted in FIG. 6. FIG. 6 again also shows the upper and lower limbs 54 and 55 respectively of the marking carrier 30 and the respective projections 58 and 59 which extend from those limbs. The electrodes 17 and 18 which are disposed on the end 9 of the tube are in this case in the form of elongated rectangles which extend in the X-direction and which again define a rectilinear measuring gap 20 between them. It will be appreciated that this embodiment may also have a calibration electrode structure, as was described above with reference to FIG. 3. Finally, FIG. 6 also shows the sinusoidal path of movement 64 followed by the electron beam impact spot when, in the presence of the illustrated marking carrier 30, it is moved in the X-direction over the entire distance of the measuring window. It will be seen that the spot 7 passes across the centre line of the measuring gap 20 at each of the projections 58 and 59. The result of that is that the output signal $U_A$ of the differential amplifier 25, as is shown in FIG. 7, has at those locations a very steep passage through zero which can therefore be exactly associated with a digital word of the computer 12. It will be seen that the output signal $U_A$ is not sinusoidal but has flattened portions in the regions of its upper and lower peaks. That signal limitation effect occurs by virtue of the fact that the absolute amount of the difference between the two currents which flow away by way of the electrodes 17 and 18 cannot increase any further when the electron beam impact spot is deflected in the direction of one electrode or the other in the Y-direction to such an extent that the whole electron beam current only flows away by way of one of the two electrodes.

The production of the magnetic regions 63 by means of an electromagnet gives the advantage that the influence of electromagnetic interference fields can be detected and ascertained by virtue of the fact that the current can be switched off or its polarity changed over, in the excitation coil 51. With the above-described initial and calibration measurement operations, there is then no need to move the measuring scale or marking carrier 30 away from the end 9 of the tube as it is sufficient in those circumstances for the excitation current of the electromagnet 50 to be switched off.

Preferably the projections 58 and 59 are not arranged in a freely projecting manner but are embedded in a non-magnetisable material with the lowest possible coefficient of expansion so as to avoid displacement of the markings defined by those projections, under the influence of variations in temperature.

Another possible way of producing the magnetic regions 33 or 63 by means of electromagnets involves the provision of a conductor winding which extends in the longitudinal direction of the measuring scale or marking carrier 30 and which is electrically continuous, that is to say it has a single excitation current flowing therethrough, the direction of winding thereof varying in a sectionwise manner so as alternately to provide mutually adjoining magnetic South and North poles. That coil may also be embedded into a carrier material with minimum coefficient of expansion. It also permits the excitation current to be switched off or reversed in polarity so that the initial and calibration measurement operations can be carried out in a simple fashion and interference influences caused by magnetic fields from the exterior can be detected.

Production of the magnetic regions 33 and 63 respectively by means of one or more electromagnets can be used in accordance with the invention not only in relation to rectilinear measuring gaps 20 but also in relation to any other shape, in particular the circular shape for an angle measuring device, as shown in FIG. 4.

I claim:

1. A measuring arrangement for determining the spacing of at least one marking provided on a body from a reference line, comprising: a cathode ray tube having an electron gun for generating an electron beam, a deflection unit for deflecting said electron beam and an end wall with an inner and an outer surface, said electron beam impinging on said inner surface and forming a beam impact spot thereon; said body carrying said at least one marking being arranged in direct vicinity of said outer surface of said end wall of the cathode ray tube and being displaceable relative thereto, wherein at least first and second electrodes are disposed at said end wall of the tube at the inside thereof and are electrically separated from each other to define a measuring gap therebetween, the dimension of said beam impact spot transversely with respect to the measuring gap being at least equal to the width of the measuring gap; and wherein means for actuating said deflection unit are provided which move said beam impact spot in the absence of an external influence along the measuring gap in such a way that the difference between current which are taken off by way of the first and second electrodes is of a predeterminable value, the body carrying the at least one marking being of such a nature at least in the region with which it moves over the cathode ray tube upon displacement of said body that it exerts on the electron beam an influence which varies with the relative position of the body with respect to the cathode ray tube and by which the beam impact spot is displaced transversely with respect to the longitudinal direction of the measuring gap.

2. A measuring arrangement as set forth in claim 1 including means for producing a magnetic field thereby to exert said influence on the electron beam.

3. A measuring arrangement as set forth in claim 2 wherein said magnetic field-producing means comprise magnetic regions which extend on the body in the direction of the displacement thereof and which are of such a nature and arrangement that two North pole ends and two South pole ends mutually adjoin each other alternatively.

4. A measuring arrangement as set forth in claim 3 wherein the magnetic regions are formed by permanent magnets.

5. A measuring arrangement as set forth in claim 3 wherein the magnetic regions are formed by electrical windings which are disposed electrically in series with each other, with alternate directions of winding, and have one and the same excitation current flowing therethrough.

6. A measuring arrangement as set forth in claim 3 wherein the magnetic regions are formed by first and second intermeshing comb-like structures comprising a material of high magnetic permeability, one thereof being magnetically conductively connected to the one pole of an electromagnet and the other to the other pole of the electromagnet.

7. A measuring arrangement as set forth in claim 1 including means for producing an electrical field thereby to exert said influence on the electron beam.

8. A measuring arrangement as set forth in claim 7 wherein the body comprises successively in the direction of displacement thereof regions with alternate electrically positive and electrically negative polarity with respect to a ground plate disposed in the vicinity of the cathode ray tube.

9. A measuring arrangement as set forth in claim 1 wherein the measuring gap is of a rectilinear configuration between the first and second electrodes.

10. A measuring arrangement as set forth in claim 1 wherein the measuring gap is of a circular configuration between the first and second electrodes.

11. A measuring arrangement as set forth in claim 1 and further including a calibration electrode structure at the end of the tube.

12. A measuring arrangement as set forth in claim 11 wherein the calibration electrode structure is formed by first and second comb-like calibration electrodes which are intermeshed in such a way that the gap which electrically separates them from each other forms meander-like loops transversely with respect to its main direction of extension which is parallel to the longitudinal direction of the measuring gap, and wherein when the beam impact spot passes over said loops at respective geometrically precisely defined locations the difference between the currents which are produced by the electron beam and which are taken away by way of the first and second calibration electrodes of the calibration electrode structure is equal to a predeterminable value.

13. A measuring arrangement as set forth in claim 12 wherein, of the first and second calibration electrodes of the calibration electrode structure, the one is electrically conductively connected to one of the electrodes defining the measuring gap and the other is electrically conductively connected to the other electrode defining the measuring gap.

14. A measuring arrangement as set forth in claim 1 wherein said predeterminable value is equal to zero.

15. A measuring arrangement for determining the spacing of at least one marking disposed on a body from a reference line, comprising: a cathode ray tube having an electron gun for generating an electron beam, a deflection unit for deflecting said electron beam and an end wall with an inner and an outer surface, said electron beam impinging on said inner surface and forming a beam impact spot thereon; said arrangement further comprising means supporting said body with its said at least one marking in operational relationship with said cathode ray tube; means for producing relative displacement between said body and said cathode ray tube; wherein at least first and second electrode portions are provided at said end of the cathode ray tube at the inside thereof and are electrically separated from each other to define a measuring gap therebetween, the width of the measuring gap being such that the dimension of the beam impact spot at the end of the cathode ray tube transversely with respect to the measuring gap is at least equal to the width of the measuring gap; means for actuating the tube deflection unit to cause the beam impact spot in the absence of external influence to move along the measuring gap in such a way that the difference between currents which are produced by impingement of the electron beam at and taken off by way of the first and second electrode portions is of a predeterminable value; and means on said body operative at least in the region in which the at least one marking moves over the cathode ray tube upon displacement of said body to exert on the electron beam an influence varying with the relative position of the body and the cathode ray tube and adjusted to cause the beam impact spot to be displaced transversely with respect to the longitudinal direction of the measuring gap.

* * * * *